Nov. 14, 1933.         A. SCHMIDT, JR         1,935,460
                    ELECTRIC VALVE CIRCUITS
                    Filed May 27, 1932
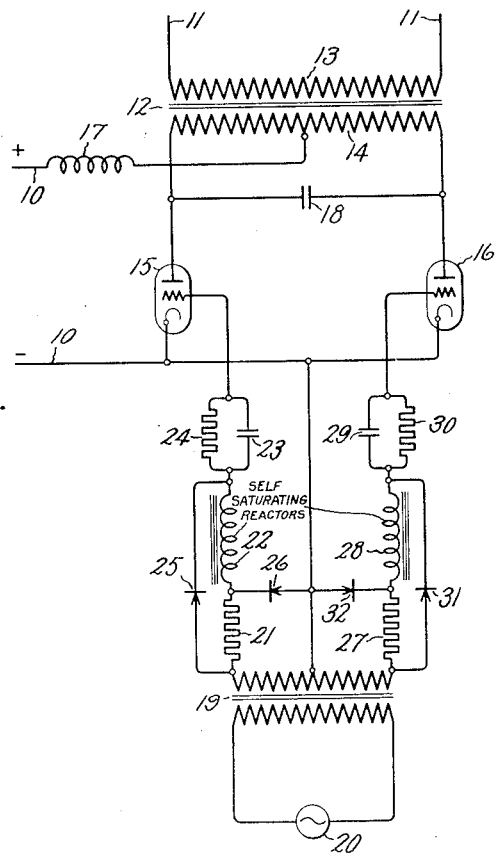
Inventor:
August Schmidt, Jr
by Charles E. Tullar
His Attorney.

Patented Nov. 14, 1933

1,935,460

UNITED STATES PATENT OFFICE 1,935,460

ELECTRIC VALVE CIRCUITS

August Schmidt, Jr., Schenectady, N. Y., assignor to General Electric Company, a corporation of New York Application May 27, 1932. Serial No. 614,126

3 Claims. (Cl. 175—363)

My invention relates to electric valve circuits and more particularly to excitation circuits for grid controlled vapor electric valves.

In the use of grid controlled vapor electric valves in electric translating circuits it is customary to determine the instant at which the valve is rendered conductive by impressing a positive potential upon its control grid. This control is often effected cyclically, in cases where the anode-cathode circuit of the valve is included in an alternating or periodic current circuit, by impressing upon the grid an alternating or periodic potential and varying the magnitude or phase relation, or both, of the periodic grid potential. The interruption of the current in valves of this type is usually determined by the external circuit; for example, in many electric translating circuits including vapor electric valves the anode potentials of the valves are periodically depressed below their respective cathode potentials to interrupt the current in the valves. In order for the grid of a valve of this type to maintain control after the anode potential again becomes positive, it is necessary that the valve become substantially completely deionized. Such deionization can be effected by impressing a high negative potential upon the grid of the valve immediately after the anode current has been interrupted therein.

In a copending application of C. H. Willis, Serial No. 613,890, filed May 27, 1932, and assigned to the same assignee as the present application, there is disclosed and claimed an excitation circuit for a vapor electric valve adapted to supply a considerable negative deionization potential to the grid of a vapor electric valve immediately after the anode current is interrupted therein. In the arrangement of that application, as well as other arrangements of the prior art, it has been found advantageous to supply a negative bias potential to the grid of the valve by means of a biasing capacitor provided with a high resistance discharge leak. My invention relates to an arrangement of the type disclosed in that application, and more specifically to means for minimizing the discharge of the bias condenser by the positive ion current.

It is an object of my invention, therefore, to provide an improved excitation circuit for a vapor electric valve which will insure a rapid deionization of the valve upon the interruption of the anode current therein, and which will maintain a relatively high negative bias potential during the idle period of the valve.

It is another object of my invention to provide an improved excitation circuit for a vapor electric valve which will supply a relatively high negative grid potential immediately after the interruption of the anode current in the valve and which will maintain a considerable negative bias potential on the grid of the valve during its inactive period.

In accordance with one embodiment of my invention an excitation circuit for a grid controlled vapor electric valve is energized from a source of alternating potential through a negative bias capacitor. The phase or wave shape of the alternating potential is such that the grid is negative for a considerable portion of each interval in which the valve is conductive so that a substantial positive ion current may flow in the grid circuit. An inductance is included in the grid circuit which, upon interruption of the anode current, supplies a relatively high voltage tending to maintain the positive ion current and rapidly deionize the valve. In order to prevent the inductance from retarding the building up of the positive grid potential, which controls the time of starting of the electric valve, a unilaterally conductive device, such, for example, as a contact rectifier, is connected in parallel to the inductance device with such a polarity as to bypass the normal grid current. The positive ion current, however, tends to discharge the bias capacitor and in order to minimize this discharge and thus maintain a sufficient negative bias potential, the magnetic characterstics of the reactor is so designed as to delay the building up of the positive ion current until just before the valve becomes non-conductive.

For a better understanding of my invention, together with other and further objects thereof, reference is had to the following description taken in connection with the accompanying drawing and its scope will be pointed out in the appended claims. The single figure of the accompanying drawing illustrates an arrangement embodying my invention for transmitting energy between a direct-current circuit and a single-phase alternating-current circuit.

Referring more particularly to the drawing there is illustrated an arrangement embodying my invention for transmitting energy from a direct-current circuit 10 to a single-phase alternating-current circuit 11. This arrangement includes a transformer 12 having a secondary winding 13 connected to the circuit 11 and a primary winding 14 provided with an electrical midpoint connected to the positive side of the direct-current circuit and with end terminals connected to the negative side of the direct-current circuit through electric valves 15 and 16. A current-smoothing reactor 17 is preferably included in the direct-current circuit, as illustrated. In case the circuit 11 is not connected to an independent source of electromotive force for commutating the current between the valves 15 and 16, a commutating capacitor 18 is preferably connected across the winding 14. However, this particular electric translating circuit forms no part of my present invention, but is an arrangement well known in the art. Electric valves 15 and 16 are each provided with an anode, a cathode, and a control grid and are of the vapor electric type, in which the starting of current in the valve may be controlled by the potential on the grid, but in which the current in the valve can be interrupted only by means of the external circuit. In order to render the electric valves 15 and 16 successively conductive to transmit alternating current to the circuit 11, their grids are excited from the opposite halves of the secondary winding of a grid transformer 19, the primary winding of which is energized from any suitable source of alternating potential 20 of a frequency which it is desired to supply the circuit 11. The transformer 19 is preferably of the self-saturating type in order to convert the alternating potential supplied by the source 20 into one of peaked wave form, an excitation which is particularly suitable for valves of the vapor electric type. However, this feature of exciting the control electrode of an electric valve with an alternating potential of peaked wave form comprises no part of my present invention but is disclosed and broadly claimed in the copending application of B. D. Bedford, Serial No. 485,335, filed September 29, 1930, and assigned to the same assignee as the present application. The grid circuit of the electric valve 15 includes also a resistor 21, a reactance device 22 and a biasing circuit comprising a capacitor 23 connected in parallel with a high-resistance discharge path 24. The reactance device 22 is preferably of the self-saturating type, that is, one which has a relatively high reactance for magnetomotive forces less than a predetermined value and relatively low reactance for higher values of magnetomotive force. In order to provide a low impedance path for the normal grid current, the reactance device 22 and resistor 21 are shunted with a unilaterally conductive device illustrated as a contact rectifier 25. In case it is desired to bypass the negative half cycles of grid potential from the grid circuit, the left-hand portion of the secondary winding of the transformer 19 may be loaded through a contact rectifier 26 and the resistor 21. Similarly, the grid circuit of the electric valve 16 includes a current limiting resistor 27, a self-saturating reactance device 28, and a bias capacitor 29 and discharge leak 30. Also the right-hand portion of the transformer winding is loaded through a contact rectifier 32 and the resistor 27. However, this feature of loading a grid transformer winding during the negative half cycles of grid potential forms no part of my present invention, but is disclosed and broadly claimed in the copending application of B. D. Bedford, Serial No. 614,134, filed May 27, 1932, and assigned to the same assignee as the present application.

The general principles of operation of the above-described translating circuit for transmitting energy from the direct-current circuit 10 to the alternating-current circuit 11 will be well understood by those skilled in the art. In brief, if one of the electric valves, for example, the valve 15, is initially rendered conductive, current will flow through the left-hand portion of the winding 14 and generate one half cycle of alternating current in the circuit 11. During this interval the capacitor 18 will become charged with such a polarity that when, substantially 180 electrical degrees later, electric valve 16 is rendered conductive, the capacitor 18 will be effective to commutate the current from the valve 15 to the valve 16. As current flows through the right-hand portion of the winding 14 and the valve 16, a half cycle of alternating current of opposite polarity will be supplied to the circuit 11. In this manner the current is successively commutated between the valves 15 and 16 and alternating current is supplied to the circuit 11 of a frequency equal to that of the source of grid potential 20.

As stated above, the transformer 19 is preferably self-saturating so that the potential appearing in the secondary winding has a peaked wave form. For example, if we consider the short interval during which a positive impulse is supplied to the left-hand terminal of the secondary winding of the transformer 19, the grid current will flow from this terminal through a rectifier 25, capacitor 23, the grid cathode circuit of the valve 15, back to the midpoint of the transformer winding. This impulse is effective to charge the capacitor 23 with its upper terminal negative and its lower terminal positive so that when the positive grid potential supplied by the transformer 19 falls to substantially zero, a value which is maintained during the larger portion of the cycle, the capacitor 23 is effective to supply a negative bias to the grid of the valve 15. The charge on the capacitor 23 tends to leak off through the high resistance device 24 and, under conditions of equilibrium, the negative bias on the capacitor 23 will be such that the charge received from the flow of normal grid current will be substantially equal to that dissipated in the resistance 24.

When the instantaneous potential of the left-hand terminal of the transformer winding is less than the bias potential of the capacitor 23, the grid of the valve 15 becomes negative and remains negative for nearly 360 electrical degrees, including the remaining period that the valve 15 is conductive. Due to its negative charge the grid of the valve 15 attracts the positive ions of the ionized space of the valve and a "positive ion current" flows in the grid circuit in a direction opposite to that of the normal grid current. However, the positive ion current cannot flow through the rectifier 26 but is confined to the path including the resistor 21 and reactor 22. When the main current has been transferred from the valve 15 to the valve 16 the reactance device 22 tends to maintain the flow of positive ion current, but due to the limited supply of positive ions in the valve 15 after the main current is interrupted, the grid cathode impedance increases substantially. However, the reactance device 22 is effective to supply the relatively high voltage necessary to maintain the flow of positive ion current until the supply of positive ions is completely exhausted, that is, until the valve 15 is deionized.

It will be noted that the positive ion current, which flows in the grid circuit in a direction opposite to that of the normal grid current, tends to discharge capacitor 23. This discharging effect may be minimized by so selecting the constants of the saturable reactor 22 that the positive ion current builds up very slowly during the greater portion of the period in which the valve 15 is conductive, but, just before the current is transferred to the valve 16, it becomes saturated so that the positive ion current builds up very rapidly. The reactance device 22 will then tend to maintain this high value of positive ion current during the interval necessary to deionize the valve 15 after the main current has been interrupted therein, but only a relatively small positive ion current will flow during the greater portion of the period in which the valve 15 is conductive. Thus, by minimizing the time during which an appreciable positive ion current flows in the grid circuit, the discharge of the capacitor 23 may be correspondingly decreased. Obviously, the grid circuit of the electric valve 16 operates in a similar manner. The loading of the two halves of the secondary winding of the transformer 19 through resistors 21 and 27 and contact rectifiers 26 and 32 serves to divert the flux from each portion of the winding during the negative half cycles to the other portion of the winding, which is of opposite polarity, and is thus effective to secure the best distribution of the transformer flux. This loading of the transformer winding also tends to prevent any direct current saturation of the transformer circuit and to bypass the high peak of negative potential from the grid circuit, which under certain circumstances may be undesirable.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an electric translating circuit, the combination of an intermittently conductive grid controlled vapor electric valve, a grid circuit for said valve including a source of alternating potential and a negative bias condenser and associated high resistance leak, and a self-saturating reactor included in said grid circuit to maintain the positive ion grid current after said valve becomes non-conductive.

2. In an electric translating circuit, the combination of an intermittently conductive grid controlled vapor electric valve, a grid circuit for said valve including a source of alternating potential and a negative bias condenser and associated high resistance leak, a self-saturating reactor included in said grid circuit and so proportioned as to be saturated by the positive ion current of the grid circuit shortly before current is interrupted in said valve, said reactor serving to maintain the positive ion current after said valve becomes non-conductive, and a unilaterally conductive device connected to bypass the normal grid current from said reactor.

3. In an electric translating circuit, the combination of an intermittently conductive grid controlled vapor electric valve, a grid circuit for said valve including a source of alternating potential, a self-saturating transformer for converting said alternating potential into one of peaked wave form, a current-limiting resistor, a negative bias capacitor and associated high resistance leak, and an inductive device to maintain the positive ion current after said valve becomes non-conductive, a rectifying device connected in parallel to said inductive means to bypass the normal grid current, and a rectifying device connected across said transformer and said resistor to bypass the negative half cycles of said peaked potential from said grid circuit.

AUGUST SCHMIDT, Jr.